(12) United States Patent
Chang

(10) Patent No.: US 7,552,351 B2
(45) Date of Patent: Jun. 23, 2009

(54) SYSTEM FOR CONTROLLING SEQUENTIAL STARTUP OF HARD DISKS

(75) Inventor: Chao-Huang Chang, Taipei (TW)

(73) Assignee: Inventec Corporation, Taipei (TW)

( * ) Notice: Subject to any disclaimer, the term of this patent is extended or adjusted under 35 U.S.C. 154(b) by 495 days.

(21) Appl. No.: 11/389,437

(22) Filed: Mar. 23, 2006

(65) Prior Publication Data

US 2007/0226523 A1 Sep. 27, 2007

(51) Int. Cl.
*G06F 1/26* (2006.01)
(52) U.S. Cl. ........................ 713/330; 365/226
(58) Field of Classification Search ................. 713/330; 365/226
See application file for complete search history.

(56) References Cited

U.S. PATENT DOCUMENTS

| | | | |
|---|---|---|---|
| 5,635,810 A * | 6/1997 | Goel | 318/719 |
| 6,738,915 B1 * | 5/2004 | Mott et al. | 713/330 |
| 6,765,373 B1 * | 7/2004 | Harvey et al. | 323/277 |
| 6,807,039 B2 * | 10/2004 | Priest | 361/93.1 |
| 6,966,006 B2 * | 11/2005 | Pacheco et al. | 713/300 |
| 7,305,572 B1 * | 12/2007 | Burroughs et al. | 713/300 |
| 7,370,220 B1 * | 5/2008 | Nguyen et al. | 713/330 |

* cited by examiner

*Primary Examiner*—Thuan N Du
(74) *Attorney, Agent, or Firm*—Jianq Chyun IP Office

(57) ABSTRACT

A system for controlling sequential startup of hard disks applicable to an electronic system with at least a first set of hard disks and a second set of hard disks is provided. A power supply module is used to provide a first power signal to the first set of hard disks to startup the first set of hard disks. A processing module is used to receive the first power signal provided by the power supply module and perform a delaying process on the first power signal to generate a delayed power signal and perform an adjustment process to the delayed power signal to generate a second power signal for outputting to the second set of hard disks, so that the first set of hard disks and the second set of hard disks can be started up sequentially.

4 Claims, 4 Drawing Sheets

SYSTEM FOR CONTROLLING SEQUENTIAL STARTUP OF HARD DISKS

FIELD OF THE INVENTION

The present invention relates to a system for controlling sequential startup of hard disks, and more particularly, to a system applicable to an electronic system with a plurality of hard disks that utilizes delay technique to control the sequential startup of the hard disks.

BACKGROUND OF THE INVENTION

A typical electronic system (computer system or server system) usually comprises three main components: a Central Processing Unit (CPU), hard disks and memories. Hard disks are one of the most important storage devices outside the system (among other auxiliary storage devices including floppy disks, compact discs, flash memories, magnetic tapes and so on) that form the data storage center for the entire system and store a majority of data and programs used when system operates. Hard disks can be divided into two types according to their interfaces: the traditional Parallel Advanced Technology Attachment (PATA) hard disks and the new Serial Advanced Technology Attachment (SATA) hard disks. Since the PATA hard disks employ parallel transmission, they generally have more pins and the width of the cable tends to be larger. Additionally, the length of the cable is limited in order to achieve simultaneous transmission. Whereas, the SATA hard disks employ serial transmission, so the number of pins thereof is smaller, the length of the cable is larger and it is easier to install. Furthermore, the speed of the SATA hard disks is greater, up to 150 MB/s, and multi-links are allowed which increases transmission speed. In the future, the SATA hard disks may become the mainstream products in the market, replacing the PATA hard disks.

During system booting, when the power is turned on, the hard disks immediately begins to operate. Each hard disk has a startup current, e.g. up to about 2 Amps (A) for a single hard disk. When the system is only connected to a single hard disk, the transient peak current of a power supply of the system is the startup current (i.e. 2A) of the hard disk. When the hard disk operates towards a steady state, the current consumed by the hard disk then reduces to a lower average value. If the number of hard disks connected to the system is small, the peak current at startup does not significantly affect the power supply. However, under the demands of ever larger storage capacity, the system tends to attach to more hard disks. In this case, the total peak current generated by these hard disks all starting up at the same time may now significantly affect the power supply. For example, a server system may be connected to up to 12 hard disks. When all 12 hard disks start up simultaneously, the total transient peak current may be as high as 24 A. The total transient peak current in this case may exceed the over-current protection threshold value of the power supply, causing system shutdown and boot failure. As described above, when 12 hard disks start up simultaneously, the total transient peak current may be as high as 24 A, an ordinary power supply cannot withstand such a high transient peak current, and may be easily burnt. In such case, a specialized and more expensive power supply is required, however, this increases cost.

Therefore, there is a need for a technique to control startup of hard disks sequentially in order to eliminate the situation of simultaneously startup of a plurality of hard disks that causes system boot failure or power supply burnt down.

SUMMARY OF THE INVENTION

In the light of forgoing drawbacks, an objective of the present invention is to provide a system for controlling sequential startup of hard disks applicable to an electronic system to ensure successful booting of the electronic system.

Another objective of the present invention is to provide a system for controlling sequential startup of hard disks applicable to en electronic system to eliminate system boot failure or power supply burnt down due to simultaneous startup of too may hard disks in the electronic system of the prior art.

Still another objective of the present invention is to provide a system for controlling sequential startup of hard disks that provides design flexibility.

Still another objective of the present invention is to provide a system for controlling sequential startup of hard disks that is able to prohibit power to be supplied to a disabled hard disk, thus conserving more power.

In accordance with the above and other objectives, the present invention provided a system for controlling sequential startup of hard disks applicable to an electronic system comprising a first set of hard disks and a second set of hard disks. The system for controlling sequential startup of hard disks may comprise: a power supply module for providing a first power signal to the first set of hard disks to startup the first set of hard disks; and a processing module for receiving the first power signal provided by the power supply module and performing a delaying process on the first power signal to generate a delayed power signal and performing an adjustment process to the delayed power signal to generate a second power signal for outputting to the second set of hard disks to startup the second set of hard disks.

In one embodiment, the system for controlling sequential startup of hard disks may further comprise a controlling module connected to the processing module to stop the operations of the processing module when the second set of hard disks is disabled, such that the second power signal is not provided to the second set of hard disks. In one embodiment, the controlling module may comprise a switching module composed mainly of a field-effect transistor.

In one embodiment, the system for controlling sequential startup of hard disks may further comprise a setting module for allowing a timing information to be set, the timing information specifying a time delayed before a Basic Input/Output System (BIOS) of the electronic system starts scanning the first and the second sets of hard disks at startup of the electronic system.

In one embodiment, the processing module may comprise: a delaying module for receiving the first power signal provided by the power supply module and performing the delaying process on the power signal to generate a delayed power signal; and a signal adjusting module for receiving the delayed power signal and performing the adjustment process on the delayed power signal to generate the second power signal for starting up the second set of the hard disks.

In one embodiment, the above delaying module is a RC (resistor-capacitor) delay circuit.

In one embodiment, the signal adjusting module may comprise: a signal waveform adjusting module for adjusting the waveform of the delayed power signal to form a power signal with an instantaneous amplitude change; and a signal amplitude adjusting module for adjusting the amplitude of the power signal outputted from the signal waveform adjusting module to generate the second power signal with an amplitude suitable for the second set of hard disks. The above signal waveform adjusting module may be composed of a transistor-transistor logic component and its peripheral element. The signal amplitude adjusting module may be composed of a signal buffering component (e.g. a 7404 open-collector buffer) and its peripheral element.

In summary, the system for controlling sequential startup of hard disks of the present invention performs a sequential delay process on power signals provided to the first, second and third sets of hard disks to generate the second, third and fourth power signals via the first, second and third processing modules, respectively. As a result, the first, second, third and fourth sets of hard disks are started up sequentially. Such as design ensures the total power signal value (or current value) does not exceed the over-current protection threshold, thus allowing the system to be booted successfully, avoiding system boot failure or power supply burnt down that sometimes happen due to simultaneous startup of too many hard disks in the prior art.

Further, when any one of the second, third and fourth sets of hard disks is disabled, the present invention can selectively stop the operations of the corresponding processing modules via the control modules, so that power is not provided to the second, third or fourth sets of hard disks, thus the present invention is more power conservative.

Moreover, the present invention allows extra sets of hard disks to be added to the server system by simply adding more processing modules and control modules thereto, therefore enhancing design flexibility.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

Figure 1:
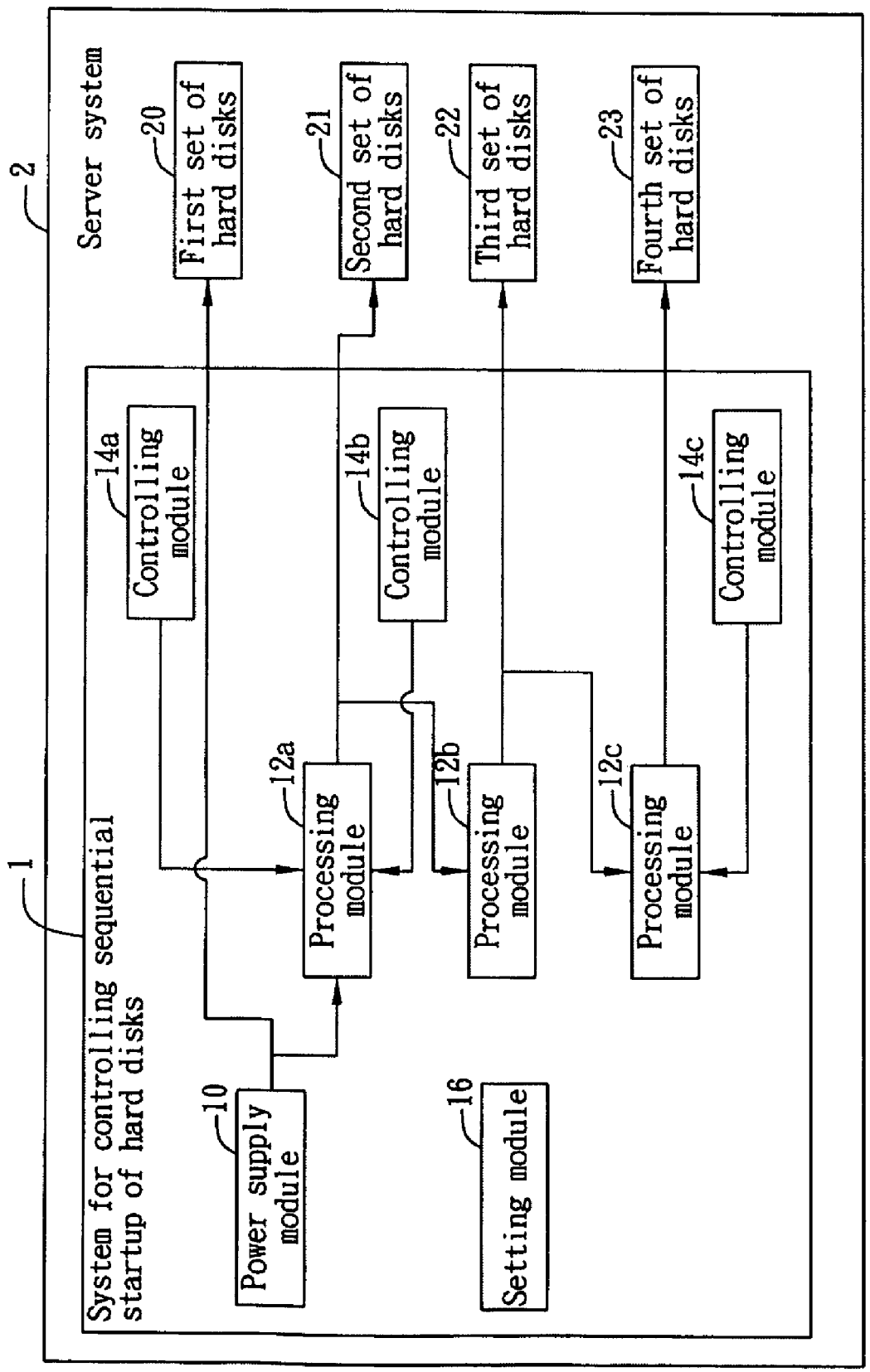
FIG. 1 is a schematic block diagram illustrating the basic structure of the system for controlling sequential startup of hard disks 1 of the present invention.

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

FIGS. 1, 2, 3, 4(a), 4(b), 4(c) and 4(d) are used to illustrate the system for controlling sequential startup of hard disks of the present invention. The preferred embodiments of the system for controlling sequential startup of hard disks of the present invention are described in details below in conjunction with the appended drawings. It should be noted, however, that these drawings are simplified to illustrate the basic structure of the present invention. Thus, only those components related to the present invention are shown in the drawings, and the actual implementations may be more complicated.

FIG. 1 is a schematic block diagram illustrating the basic structure of the system for controlling sequential startup of hard disks 1 of the present invention. As shown, the system for controlling sequential startup of hard disks 1 is applied to an electronic system with a number of sets of hard disks. The numerous sets of hard disks can be booted sequentially by employing the system 1 of the present invention, thus eliminating the situation of simultaneous startup of all hard disks in the electronic system that may cause electronic system boot failure. Therefore, the system 1 of the present invention may ensure the stable operation of the electronic system. The above electronic system is a computer system or a server system. The electronic system hereafter will be referred to as a server system 2 for illustration and simplicity purposes. The server system 2 comprises a first, a second, a third, and a fourth set of hard disks 20, 21, 22 and 23 as shown. Each set of the hard disks may, for example, comprise three hard disks; however, the present invention is not limited to this. The hard disks are SATA (Serial Advanced Technology Attachment) hard disks.

As shown in FIG. 1, the system for controlling sequential startup of hard disks 1 may comprise a power supply module 10, processing modules 12a, 12b and 12c, controlling modules 14a, 14b and 14c and a setting module 16. The roles of the power supply module 10, processing modules 12a, 12b and 12c, controlling modules 14a, 14b and 14c and the setting module 16 will now be described.

The power supply module 10 is used to provide a first power signal to the first set of hard disks 20, so that all the hard disks in the first set of hard disks 20 simultaneously start up in response to the first power signal. In this embodiment, the power supply module 10 is the power supply circuit of the above server system 2. During booting of the server system 2, when the power supply module 10 is turned on, each of the hard disks in the first set of hard disks 20 are driven to operate in response to the first power signal provided by the power supply module 10. The above first power signal is a voltage signal (such as a 12 volts (V) signal), in other embodiments, however, the power signal can also be a current signal. Furthermore, in another embodiment of the present invention, the power supply module 10 can be an independent power supply external to the server system 2.

The processing module 12a is used to receive the power signal provided by the power supply module 10, delay and adjust the power signal to generate a second power signal for booting the second set of hard disks 21, allowing each one of the hard disks in the second set of hard disks 21 to start up in response to the second power signal. In this embodiment, the first power signal is delayed by a delay factor $\Delta T1$ by the processing module 12a to generate the second power signal that is outputted to the second set of hard disks.

The processing module 12b is used to receive the second power signal outputted by the processing module 12a, and process the second power signal in a similar manner as the processing module 12a above, that is, delay and adjust the second power signal to generate a third power signal for booting the third set of hard disks 22, allowing each one of the hard disks in the third set of hard disks 22 to start up in response to the third power signal. In this embodiment, the second power signal is delayed by a delay factor $\Delta T2$ by the processing module 12b to generate the third power signal that is outputted to the third set of hard disks.

The processing module 12c is used to receive the third power signal outputted by the processing module 12b, and process the third power signal in a similar manner as the processing modules 12a and 12b above, that is, delay and adjust the third power signal to generate a fourth power signal for booting the fourth set of hard disks 23, allowing each one of the hard disks in the fourth set of hard disks 23 to start up in response to the fourth power signal. In this embodiment, the third power signal is delayed by a delay factor ΔT3 by the processing module 12c to generate the fourth power signal that is outputted to the fourth set of hard disks.

In this embodiment, the delay factors ΔT1, ΔT2 and ΔT3 are the same, such as four seconds. Accordingly, the second set of hard disks 21 starts up four seconds later than the first set of hard disks 20, the third set of hard disks 22 starts up four seconds later than the second set of hard disks 21 (i.e. 8 seconds later than the first set of hard disks 20) and the fourth set of hard disks 23 starts up four seconds later than the third set of hard disks 22 (i.e. 12 seconds later than the first set of hard disks 20). Thus, this sequential startup of the hard disks ensures the total peak current does not exceed a preset overcurrent protection threshold value of the power supply module, allowing the server system 2 to be normally booted. However, it should be noted that, the above delay factors ΔT1, ΔT2 and ΔT3 may be different based on physical electrical signal designs.

The control module 14a is used to control the actions of the processing module 12a. In this embodiment, when the second set of hard disks 21 in the server system 2 is disabled, the control module 14a may prohibit the processing module 12a from performing the delay and adjustment described above. That is, the second power signal is no longer provided to the second set of hard disks 21.

Similarly, the control module 14b is used to control the actions of the processing module 12b. In this embodiment, when the third set of hard disks 22 in the server system 2 is disabled, the control module 14b may prohibit the processing module 12b from performing the delay and adjustment described above. In other words, the third power signal is no longer provided to the third set of hard disks 22. Similarly, the control module 14c is used to control the actions of the processing module 12c. In this embodiment, when the fourth set of hard disks 23 in the server system 2 is disabled, the control module 14c may prohibit the processing module 12c from performing the delay and adjustment described above. In other words, the fourth power signal is no longer provided to the fourth set of hard disks 23.

Therefore, in this embodiment, when any one of the second set of hard disks 21, third set of hard disks 22 and fourth set of hard disks 23 connected to the server system 2 is disabled, the corresponding processing modules (12a, 12b, 12c) may stop processing by the above control modules (14a, 14b, 14c). Thus, the present invention not only eliminates unacceptably high transient current as a result of simultaneous startup of hard disks in the server system 2, but also enhances power efficiency by avoiding unnecessary power consumption.

The setting module 16 allows timing information to be set during booting of the server system 2. The timing information is related to the time delayed before the BIOS (Basic Input/Output System) of the server system 2 starts to scan the hard disks. In this embodiment, the setting module 16 is the BIOS setting interface of the server system 2, which allows users to set a time during booting of the server system 2. This time specifies the time (e.g. 12 seconds) delayed before the BIOS, after entering into the OPTION ROM (BIOS codes in the add-in card), starts scanning the hard disks in order to start initializing, reading and writing the hard disks. This can avoid the hard disks to be determined as unfound before power is actually supplied thereto.

Figure 2:
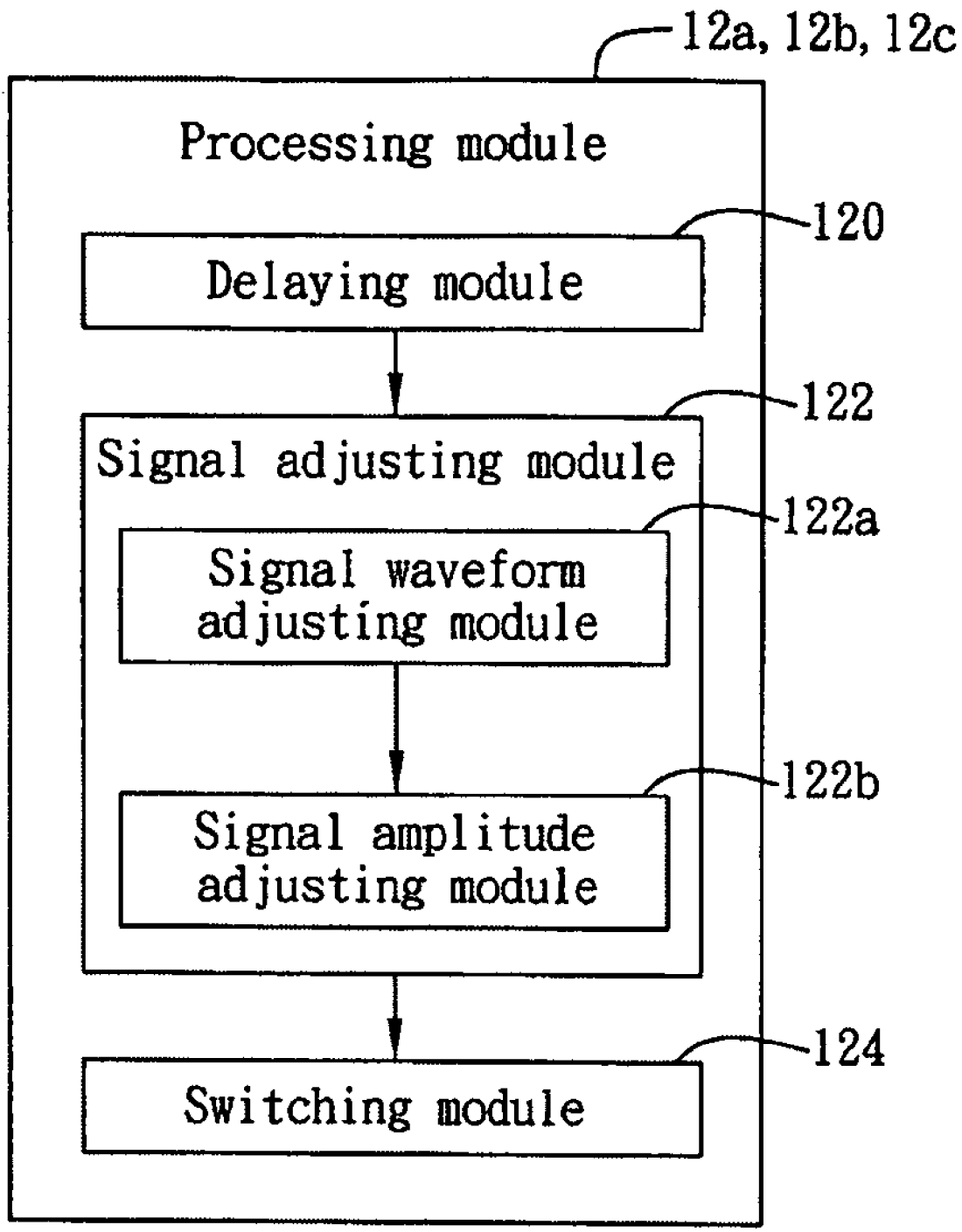
FIG. 2 shows an embodiment of the basic framework of a processing module in FIG. 1.

FIG. 2 shows an embodiment of the basic framework of the processing modules (12a, 12b, 12c) of the present invention. As shown, each of the processing modules (12a, 12b, 12c) includes a delaying module 20, a signal adjusting module 122 and a switching module 124. The delaying module 20, signal adjusting module 122 and switching module 124 of the processing module 12a will now be described in details.

Figure 3:
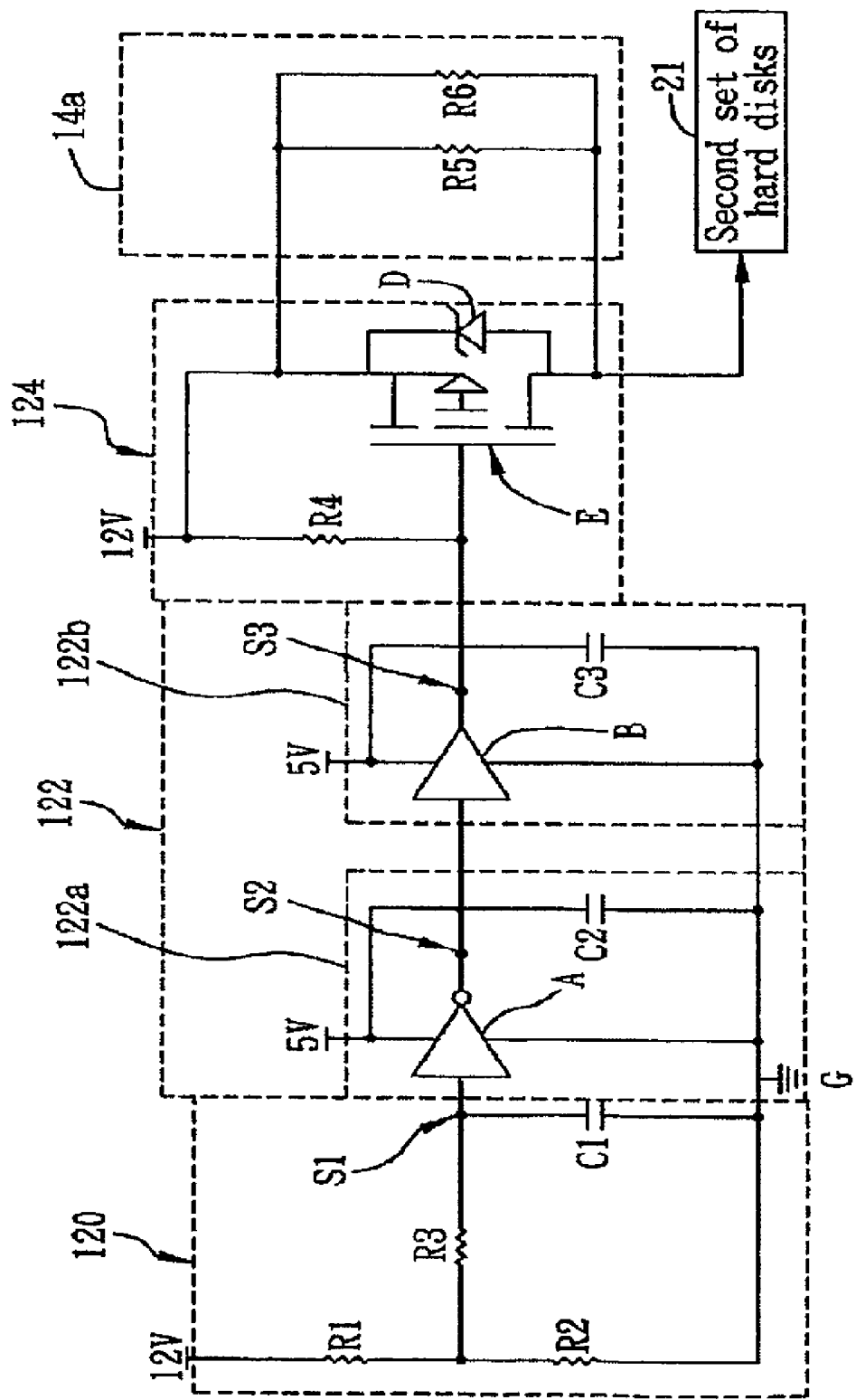
FIG. 3 is a circuit diagram showing the processing module and a controlling module in FIG. 1.

The delaying module 120 is used to receive the first power signal provided from the power supply module 10, and generate a delayed power signal output of the first power signal received. Referring to FIG. 3 in conjunction, the delaying module is a RC delay circuit composed of resistor R3 and capacitor C1 (one end of C1 is connected to ground) and other auxiliary elements (e.g. resistors R1 and R2 shown in FIG. 3). The delay factor (i.e. abovementioned delay factor ΔT1) can be set by the resistor and capacitor. In the present invention, the delay of four seconds of the first power signal is set via selecting appropriate values of the resistor R and capacitor C, but the present invention is not limited to this.

Figure 4A:
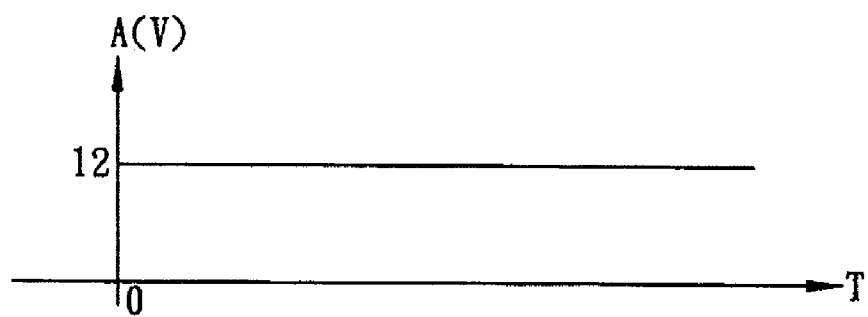
FIG. 4(a) shows a first power signal provided by a power supply module in FIG. 1.
Figure 4B:
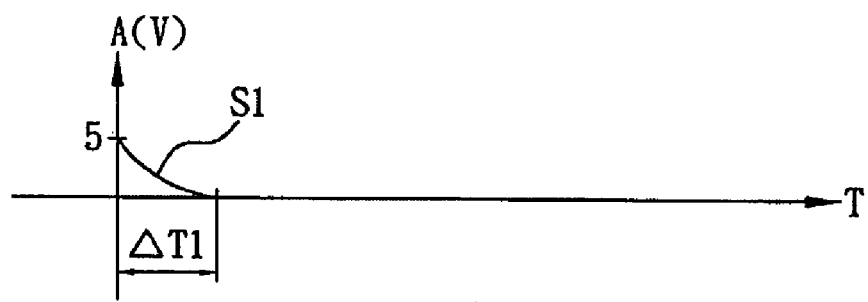
FIG. 4(b) to 4(d) respectively show signals S1, S2 and S3 outputted by a delaying module, a signal waveform adjusting module and a signal amplitude adjusting module of FIG. 3 by sequentially processing the first power signal.
Figure 4C:
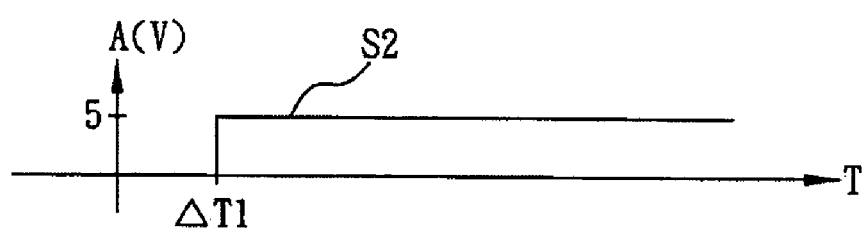

Referring to FIG. 4(a) in conjunction, which shows a power signal 12 V provided by the power supply module 10, where X-axis represents the time T and Y-axis represents the signal amplitude A, the 12V power signal is divided by a voltage divider (composed of resistors R1 and R2, where one end of R2 is connected to ground) to generate a 5V power signal output. This 5V power signal is then delayed by the RC delay circuit (i.e. R3 and C1) so that a signal S1, depicted in FIG. 4(b), appears at the other end of C1. The amplitude of this signal S1 changes from 5V to 0V by a delay factor of ΔT1 (i.e. in four seconds). As depicted in FIG. 4(b), the edge of the signal S1 gradually descends to 0V.

The signal adjusting module 122 is used to receive the delayed power signal and adjusts the delayed power signal to generate the second power signal for outputting and booting the second set of hard disks 21 via the switching module 124, so that each hard disk in the second set of hard disks starts up in response to the second power signal.

In this embodiment, the signal adjusting module 122 is used to perform waveform and amplitude adjustments on the delayed power signal. Accordingly, the signal switching module 122 includes a signal waveform adjusting module 122a and a signal amplitude adjusting module 122b, wherein the signal waveform adjusting module 122a is used to adjust the waveform of the delayed power signal, such that the delayed power signal is adjusted to be a power signal with an instantaneous amplitude change, which is then amplitude-adjusted by the signal amplitude adjusting module 122b to generate an amplitude value required for booting the second set of hard disks 21.

Referring back to FIG. 3, the signal waveform adjusting module 122a is a circuit composed of a TTL (transistor-transistor logic) component A and its auxiliary element (e.g. capacitor C2). As shown, the TTL component A is connected to a power supply of 5V and receives the abovementioned signal S1. More particularly, the TTL component A accelerates the descending edge of the signal S1 in FIG. 4(b), and then inverts the accelerated signal to output a signal S2 shown in FIG. 4(c), wherein the X-axis represents time T, and the Y-axis represents the signal amplitude value A. The outputted signal S2 is then sent to the signal amplitude adjusting module 122b. As shown, the signal S2 is delayed by ΔT1 relative to the power supply 12V.

Figure 4D:
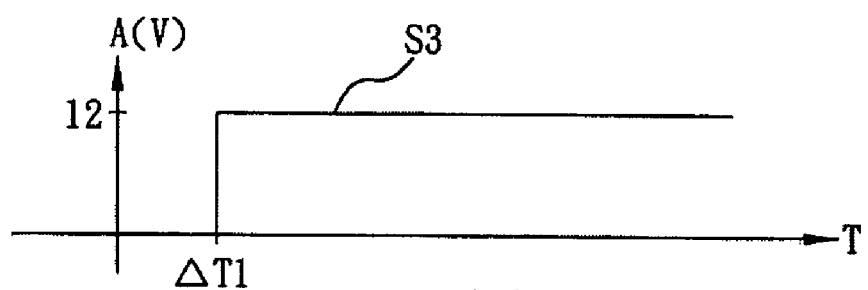

In FIG. 3, the signal amplitude adjusting module 122b is a circuit composed of a signal buffering component (an open collector such as a 7404 buffer) B and its auxiliary element (e.g. capacitor C3). The signal buffering component B is connected to the power supply of 5V and ground G. In this embodiment, the signal buffering component B adjusts the amplitude of the above signal S2 to 12 V, that is, generates the second power signal S3 with an amplitude of 12V as shown in FIG. 4(d), wherein the X-axis represents time T and the Y-axis represents the amplitude A. The signal S3 is delayed by ΔT1 relative to the power supply 12V.

In FIG. 3, the switching module 124 is composed of a FET (field effect transistor) E and its auxiliary elements (e.g. diode D and resistor R4). The FET E is connected to the power supply 12V. In this embodiment, the above second power signal S3 is outputted to the second set of hard disks via the switching module 124.

Additionally, in this embodiment, each of the control modules 14a, 14b and 14c above is composed of resistors connected in parallel. Referring to FIG. 3, the control module 14a is composed of resistors R5 and R6 in parallel with each other. The resistors R5 and R6 are both zero-ohm resistors. When the second set of hard disks is enabled, the parallel resistors R5 and R6 are floated to allow the processing module to work properly. When the second set of hard disks in the server system 2 is disabled (hard disks may be detached or attached), the resistors R5 and R6 in parallel short circuit the drain and source of the FET E, thereby prohibits functioning of the processing module.

Furthermore, in the present invention, the basic structures, principles and circuits of the processing modules 12b and 12C are the same as those of the processing module 12a. Thus, they will not be described for simplicity purpose. It should be noted, however, that the elements and components shown in the circuit diagram can be replaced with equivalent elements or components, thus they are not limited to those shown in FIG. 3.

In addition, the number of processing modules and control modules can be changed according to the electrical design needs to satisfy the additional sets of hard disks added to the server system 2.

In summary, the system for controlling sequential startup of hard disks of the present invention performs a sequential delay process on power signals provided to the first, second and third sets of hard disks to generate the second, third and fourth power signals via the first, second and third processing modules, respectively. As a result, the first, second, third and fourth sets of hard disks are started up sequentially. Such as design ensures the total power signal value (or current value) does not exceed the over-current protection threshold, thus allowing the system to be booted successfully, avoiding system boot failure or power supply burnt down that sometimes happen due to simultaneous startup of too many hard disks in the prior art.

Further, when any one of the second, third and fourth sets of hard disks is disabled, the present invention can selectively stop the operations of the corresponding processing modules via the control modules, so that power is not provided to the second, third or fourth sets of hard disks, thus the present invention is more power conservative.

Moreover, the present invention allows extra sets of hard disks to be added to the server system by simply adding more processing modules and control modules thereto, therefore enhancing design flexibility.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A system for controlling sequential startup of hard disks applicable to an electronic system comprising a first set of hard disks and a second set of hard disks, the system comprising:

a power supply module for providing a first power signal to the first set of hard disks, and starting up the first set of hard disks accordingly; and a processing module, comprising:

a delay module, coupled to the power supply module, for receiving the first power signal provided by the power supply module and performing a delaying process on the first power signal to generate a delayed power signal, wherein the delay module comprises:

a first resistor, having a first terminal coupled to the first power signal;

a second resistor, having a first terminal coupled to a second terminal of the first resistor, and a second terminal coupled to a ground potential;

a third resistor, having a first terminal coupled to the second terminal of the first resistor; and a first capacitor, having a first terminal coupled to a second terminal of the third resistor, and a second terminal coupled the ground potential;

a signal adjusting module, comprising:

a signal waveform adjusting module, coupled to the delay module, for receiving and adjusting the delayed power signal to form a power signal with an instantaneous amplitude change, wherein the signal waveform adjusting module comprises an inverter having an input terminal coupled to the second terminal of the third resistor, and an output terminal outputting the power signal with an instantaneous amplitude change; and a signal amplitude adjusting module, coupled to the signal waveform adjusting module, for receiving and adjusting the amplitude of the power signal outputted from the signal waveform adjusting module to generate a second power signal, wherein the signal amplitude adjusting module comprises a buffer having an input terminal coupled to the output terminal of the inverter, and an output terminal outputting the second power signal; and a switching module, coupled to the power supply module and the signal adjusting module, for receiving the first power signal and the second power signal, and determining whether or not the first power signal is provided to the second set of hard disks for starting up the second set of hard disks according to the second power signal, wherein the switching module comprises:

a fourth resistor, having a first terminal coupled to the first power signal, and a second terminal coupled to the output terminal of the buffer;

a transistor, having a gate coupled to the second terminal of the fourth resistor, a first terminal coupled to the first power signal, and a second terminal coupled to the second set of hard disks; and a diode, having an anode coupled to the second terminal of the transistor, and a cathode coupled to the first terminal of the transistor.

2. The system as claimed in claim 1, further comprising:

a controlling module connected to the processing module to stop the operations of the processing module when the second set of hard disks is disabled, such that the first power signal is not provided to the second set of hard disks.

3. The system as claimed in claim 1, further comprising:
a setting module for allowing a timing information to be set, the timing information specifying a time delayed before a Basic Input/Output System (BIOS) of the electronic system starts scanning the first and the second sets of hard disks at startup of the electronic system.

4. The system as claimed in claim 1, wherein the hard disks are Serial Advanced Technology Attachment (SATA) hard disks.

* * * * *